United States Patent [19]

Hodge et al.

[11] Patent Number: 5,029,958
[45] Date of Patent: Jul. 9, 1991

[54] OPTICAL FIBER ENCLOSURE FOR OPTSELECTRONIC CONVERTER

[75] Inventors: Ron Hodge, Lawrenceville; Tareg Hassan, Norcross, both of Ga.

[73] Assignee: Scientific-Atlanta, Inc., Atlanta, Ga.

[21] Appl. No.: 344,706

[22] Filed: Apr. 28, 1989

[51] Int. Cl.⁵ .............................................. G02B 6/36
[52] U.S. Cl. ................................................ 350/96.2
[58] Field of Search ............. 350/96.2, 96.21, 96.23; 174/70 S

[56] References Cited

U.S. PATENT DOCUMENTS

| | | | |
|---|---|---|---|
| 4,266,853 | 5/1981 | Hutchins et al. | 350/96.20 |
| 4,319,951 | 3/1982 | Korbelak et al. | 156/502 |
| 4,359,262 | 11/1982 | Dolan | 350/96.20 |
| 4,505,540 | 3/1985 | Furusawa et al. | 350/96.2 |
| 4,598,290 | 7/1986 | Collins et al. | 350/96.2 |
| 4,619,499 | 10/1986 | Gerber | 350/96.20 |
| 4,627,686 | 12/1986 | Szentesi | 350/96.20 |
| 4,632,507 | 12/1986 | Mignien et al. | 350/96.2 |
| 4,678,270 | 7/1987 | Gann et al. | 350/96.2 |
| 4,717,231 | 1/1988 | Denez et al. | 350/96.2 |
| 4,753,499 | 6/1988 | Malkani et al. | 350/96.2 |
| 4,765,709 | 8/1988 | Suillerot et al. | 350/96.2 |
| 4,805,979 | 2/1989 | Bossard et al. | 350/96.20 |
| 4,812,004 | 3/1989 | Biederstedt et al. | 350/96.20 |
| 4,834,479 | 5/1989 | Adl | 350/96.2 |

Primary Examiner—John D. Lee
Assistant Examiner—John Ngo
Attorney, Agent, or Firm—William A. Marvin

[57] ABSTRACT

The present invention relates to an attachment (optical fiber sidecar) to the outer casing of a component of an RF distribution system, which provides a sealed enclosure in which one or more idividual optical fibers may be separated from a main optical fiber transmission medium, and a conduit through which the individual fibers may be passed for connection to components housed in the RF casing.

12 Claims, 2 Drawing Sheets

OPTICAL FIBER ENCLOSURE FOR OPTSELECTRONIC CONVERTER

BACKGROUND AND SUMMARY OF THE INVENTION

The present invention relates to CATV (Cable Television) distribution systems that utilize optical or light wave communication links, in combination with conventional radio frequency (RF) communication links, for the distribution of broadband CATV signals. More specifically, the present invention relates to an attachment ("sidecar") to the outer casing of a component of an RF distribution system, which provides a sealed enclosure in which one or more individual optical fibers may be separated from a main optical fiber transmission medium, and a conduit through which the individual fibers may be passed for connection to components housed in the RF casing.

In a conventional CATV distribution system, as shown in FIG. 5, the origination point of all signals carried on the system is the "headend", which typically consists of an antenna system, signal-processing equipment, combining networks and other related equipment. Television signals from commercial broadcast stations are collected from large "off air" television antennas and satellite earth receiving stations and transmitted over coaxial cable to the signal-processing equipment. The signal processor includes a number of electronic components that perform a variety of functions, including amplification of the collected signals before transmission to the distribution network, filtering out unwanted signals, adjusting the output level or strength of the collected signals so that all signals that are carried have close to the same level, converting the collected signals to transmission channels that are optimized for application to the cable system, and converting UHF signals to VHF cable channels. Finally, the combining network groups the signals from each cable channel into a single output for connection to a single coaxial cable for distribution through the CATV network.

The portion of the distribution system into which the headend output signals ar fed is generally called the trunk system, which is designed for bulk transportation of multi-channeled broad band CATV signals throughout the area to be covered by the cable system. Because the cable system distribution area tends to be quite large, the trunk system typically consists of coaxial cable with a series or cascade of 20 or more trunk amplifiers installed at intervals along the cable. The trunk amplifiers are necessary to compensate for the inherent losses in signal strength (attenuation) caused by transmission via coaxial cable. The signals are equalized and amplified by the trunk amplifiers such that the cable losses preceding each amplifier equal the gain of the amplifier. In other words, each cable span-amplifier combination forms a "unity gain" system, so that when span loss and amplifier gain are algebraically summed, the net system gain equals zero. Consequently, if each cable span-amplifier combination conforms to the unity gain principal, the entire trunk system will exhibit zero net gain.

Bridging amplifiers are used to feed signals from the trunk system to the feeder system of distribution lines that bring the signals to the subscribers. Directional couplers and/or splitters are used to select a portion of the signal from a trunk amplifier to be fed to the bridger amplifier. The trunk cable continues to other bridging stations (distribution nodes), where the signals are routed through distribution lines to other subscribers.

Up to four distribution or feeder lines are fed from each bridging amplifier to the subscriber areas. The distribution lines are also made of coaxial cable, though usually of a smaller diameter than the trunk cable. The signals travel down the feeder lines to the location of the first subscriber or subscribers. At this point, it is necessary to tap the signal off of the feeder lines so that it can be delivered to the subscriber residences. Directional taps and multitaps are used to tap the signals off the distribution lines. When the distribution lines are sufficiently long that the signal drops below the desired operating level due to losses from the coaxial cable and tap devices, one or more line extender amplifiers may be installed to compensate for the signal attenuation. The output of the tap devices feed flexible coaxial cable drop lines into the subscriber homes.

The various components of the CATV distribution network are installed in a number of different physical environments. For example, the trunk system may have trunk cable laid in underground ducts, with distribution nodes interfacing the feeder system placed above ground on telephone poles. Because many of the components are exposed to potentially damaging conditions, such as moisture, excessive heat or cold, and dirt or other contaminants, suitable materials must be utilized to render the component housings or casings water-tight and pressure-tight. In addition, the casings must provide shielding against emissions of excessive RF interference from the internal electronic components and leakage of electromagnetic interference into the casings. A die-cast aluminum casing with conductive silicone gasket seals is one example of a casing having the required sealing and shielding properties.

As stated above, one of the problems in CATV distribution networks is signal loss or attenuation. Another problem is the introduction of noise and distortion to the television signal by the various components in the network. For example, in the trunk system, cascades of trunk amplifiers are necessary to maintain the television signals at a desired output level. However, each amplifier contributes some noise and distortion. Thus, the wider the area covered by the CATV system, the greater the number of amplifiers required and consequently, the greater the amount of noise and distortion added.

In order to limit signal loss while also minimizing the introduction of noise and distortion, light wave communication over optical fibers has been effectively employed between the distribution system headend and distribution nodes to distribute multi-channeled broadband CATV signals. Optical fibers have low signal attenuation in comparison to conventional coaxial cable. Thus, light can be transmitted for long distances over optical fiber without requiring amplifiers. Use of optical fiber transmission media allows the elimination of the 20 or more trunk amplifiers that are needed for conventional trunk coaxial cables connecting the headend to distribution nodes for subscribers, thereby eliminating the noise and distortion caused by such amplifiers.

Problems remain, however, in the distribution of the signals from the fiber to the individual subscribers. As distinguished from RF signals carried by coaxial cables, which can be split off a main coaxial cable using inexpensive passive taps for distribution to subscribers, optical signals are difficult to divide without signal loss and/or distortion.

One way of solving this problem is to convert the signals delivered by the optical trunk lines to electrical RF signals ("optoelectric conversion") at the various bridging stations. The optoelectric conversion generates a broadband RF signal, which is fed via bridging amplifiers to the feeder system of coaxial cable distribution lines, as described above.

In connecting an optical fiber, either to another optical fiber or to an electronic device, consideration must be given to minimizing losses arising from the connection. Such losses can arise from fiber misalignment, reflection of internal light at the fiber end, and even dirt in the connection. Another source of signal attenuation results from bending effects. When an optical fiber is bent, light being guided within the fiber core may strike the boundary between the core and its surrounding cladding at an angle too large for the light to be reflected back within the core, resulting in the loss of light from the fiber. Excessive bending can also cause breakage of optical fibers. Thus, each optical fiber has a minimum bend radius which indicates the degree of bending the fiber can undergo before experiencing signal loss or physical damage.

Accordingly, it is an object of this invention to provide an optical fiber sidecar for an optoelectric signal converter that provides an enclosure in which individual optical fibers may be pulled off a main fiber cable for connection to the optoelectric converter, from which the RF signal continues through the CATV distribution system along coaxial cable to the subscribers.

It is a further object of this invention to provide an optical fiber sidecar that allows optical fibers to be connected to an optoelectric converter without attenuation of the broadband signal due to bending losses.

It is still a further object of this invention to provide an optical fiber sidecar that is pressure-tight and water-tight and is shielded against electromagnetic interference leakage.

Preferably, the optical sidecar comprises a sealed enclosure fixedly attached to the housing of the signal conversion device (trunk housing) in a pressure-tight and waterproof relationship to protect the optical fibers from physical degradation. The optical sidecar may further be shielded against electromagnetic interference (EMI) to prevent the introduction of signal noise from external sources and to prevent RF signals carried by the system from being emitted. The optical sidecar further comprises a sealed conduit between the optical sidecar and the signal converter housing that preferably maintains a pressure- and water-tight and shielded relationship and through which the optical fibers are passed to the optoelectric converter.

In a preferred embodiment, the main fiber cable is passed through the optical sidecar, with the cable entrance and exit openings suitably sealed to maintain the optical sidecar enclosure and adjacent trunk housing in a sealed and shielded relationship. Within the enclosure, up to four individual fibers are separated from the main cable by cutting or other suitable techniques. The individual fibers are then connected to short lengths of optical fiber, commonly referred to as "pigtails", by fusion splicing, which is a welded, permanent connection of two fiber ends that yields very low signal losses. A plurality of splicing trays are preferably provided within the optical sidecar enclosure to position the spliced fibers such that the minimum bend radius of each fiber is not exceeded. The optical sidecar conduit, which may for example take the form of a throughbore or bushing-grommet combination, is made just large enough in diameter to allow the fiber pigtails to pass through into the optoelectric converter housing for connection to the signal conversion device. The fiber pigtails may be connected to the optoelectric converter by any suitable technique, such as fusion splicing to an optical fiber pigtail extending from the converter or low-loss fiber connector port mounted on the converter.

BRIEF DESCRIPTION OF THE DRAWINGS

The present invention will be described in further detail with reference to the accompanying drawings.

DETAILED DESCRIPTION

Figure 1:
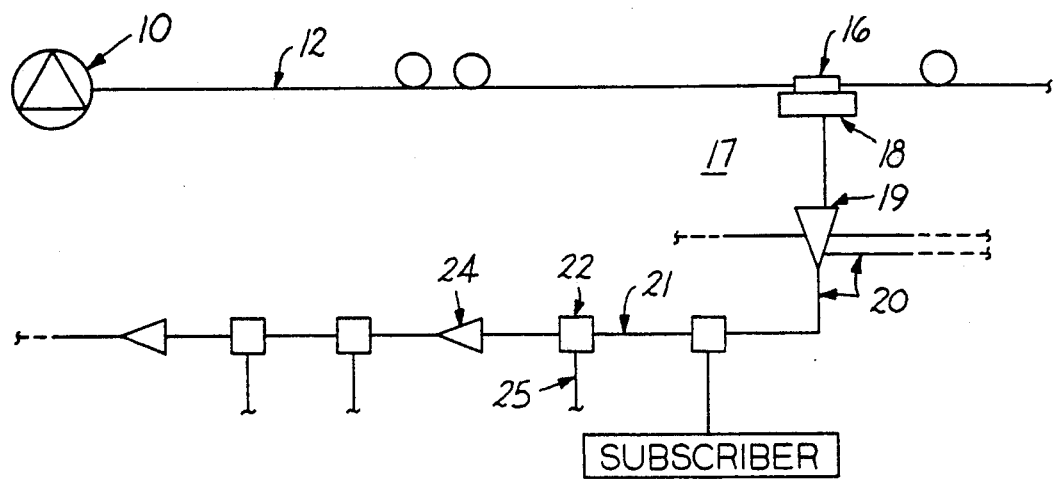
FIG. 1 is a diagrammatic view of a CATV optical distribution system incorporating the present invention.

In FIG. 1, there is shown a fiber optic CATV distribution network incorporating the present invention. All of the cable channels, which may each be about 4.5 MHz wide (TV-1 to TV-N), arrive at the headend 10 and are converted to different channels in the frequency space or spectrum of the broadband CATV signal. This spectrum in conventional CATV equipment extends from 54 to 550 MHz. The broadband signal is obtained using combiners and applied as an RF modulating signal to an electro-optical transmitter. The transmitter includes a laser diode that is biased in its stimulated emission (lasing) mode by passing a DC bias current of sufficient amplitude therethrough. This current is modulated with the RF broadband multi-channel CATV signal. Thus, an amplitude-modulated, frequency-division multiplexed (AM-FDM) signal, with each channel of the broadband multi-channel CATV signal in a different, successive frequency band, for instance 4.5 MHz wide with a 2 MHz guard band, may be generated and transmitted into one end of fiber cable 12. While amplitude modulation has been described in connection with the CATV distribution system shown in FIG. 1, frequency modulation or a combination of amplitude and frequency modulation may also be advantageously employed.

The fiber cable 12 may comprise one or more optical fibers 14. The laser diode is optically coupled to optical fibers 14, for example single mode optical fibers, and the light beam generated by the laser is sent through the optical fibers 14. The laser beam wavelength will typically be in a range between 1.3 and 1.5 microns, with 1.3 microns being the wavelength at which maximum lasing power is produced in the laser diode. The fiber cable 12 is typically at least 6 kilometers (km) long, and may be as long as 30 km without requiring the insertion of repeaters with trunk amplifiers. At the downstream end of the cable 12, the fibers 14 are coupled to distribution nodes 17, comprising an optical fiber sidecar 16, an optoelectric converter 18 and an optoelectronic bridging amplifier 19.

Individual optical fibers 14 pulled off the main cable 12 are connected to optoelectric converter 18. Converter 18 includes a photo diode of a photodetector, which provides an output current that varies in accordance with the amplitude modulation of the optical signal. Accordingly, a broadband signal, which is a replica of the original AM-FDM signal, is produced by the converter 18 and amplified by bridging amplifier 19.

Distribution nodes 17 are connected to a cell of electrical distribution lines 20, typically coaxial cable, which extends the distribution network into the vicinity of the subscriber. This cell generally has a limited cascade of interconnecting coaxial cable 21 and one or more taps or multitaps 22. Distribution lines 20 contain one or more line extender amplifiers 24, depending upon their length. Coaxial cable drop lines 25 connect the tap devices 22 to the various subscribers.

The CATV distribution network thus has a high degree of transparency, that is, low loss, noise and distortion, between the headend and subscribers, through the introduction of an optical fiber trunk line in place of the conventional coaxial trunk cable and long cascade of trunk amplifiers. Fiber cable 12 provides a low-loss, low-distortion communication link. The transparency of this link is not substantially impaired by the limited cascade of passive taps and line extender amplifiers needed to reach the subscribers, since the length of the limited cascade is small in comparison to the optical fiber cable span. Thus, broad bandwidth signals may be advantageously transmitted, including even broader bandwidth signals than now conventionally required so as to achieve the quality and definition of television pictures to be generated in accordance with emerging bandwidth-intensive technologies, such as high definition television (HDTV).

Figure 2:
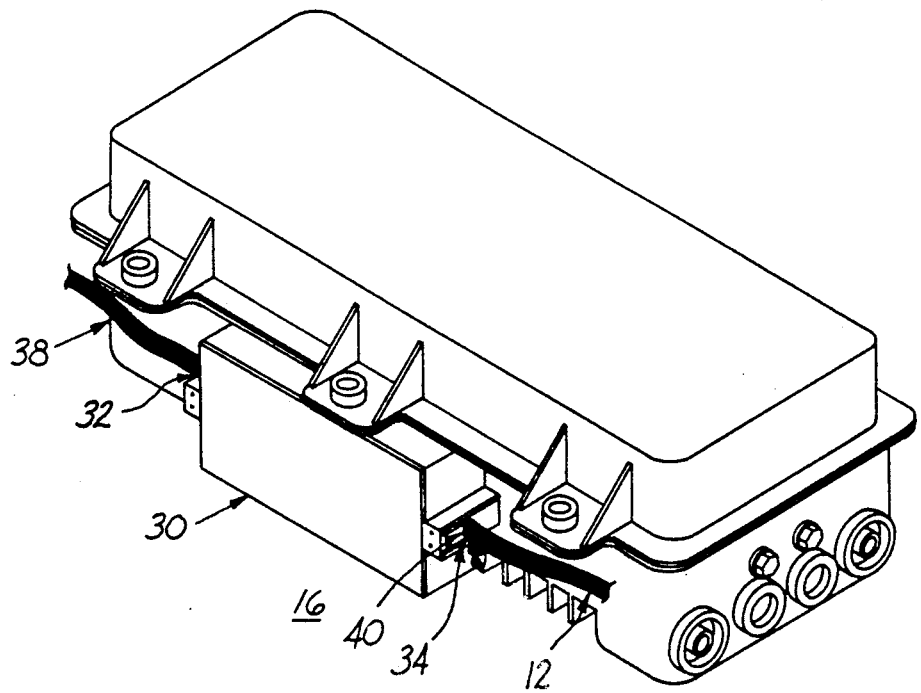
FIG. 2 is a perspective view of a preferred embodiment of the present invention.
Figure 3:
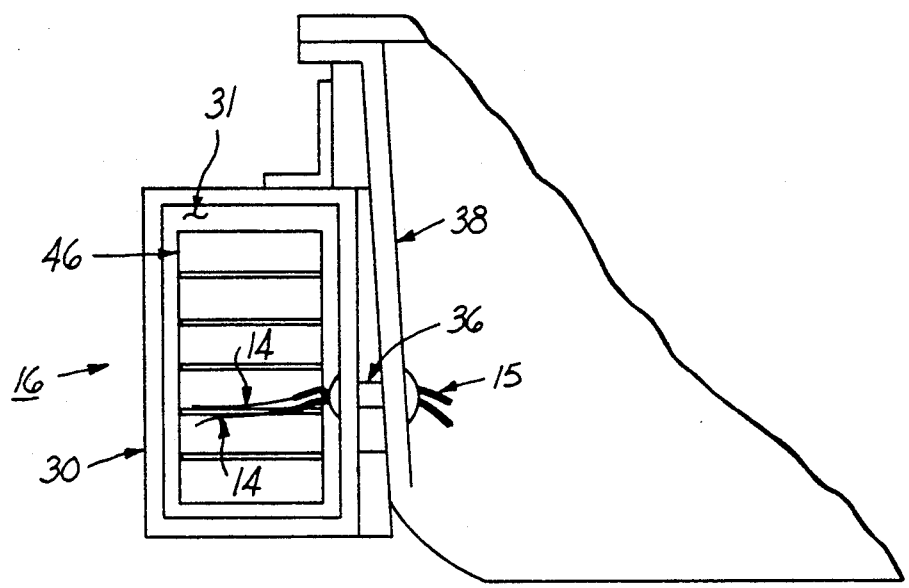
FIG. 3 is a partial sectional side view of the optical fiber sidecar of FIG. 2.

Referring now to FIGS. 2 and 3, details of a preferred embodiment of the fiber optical sidecar 16 are shown. The optical sidecar 16 comprises a rigid housing 30, preferably metal, such as die-cast aluminum, forming a sealed inner enclosure 31. Inner enclosure 31 can be accessed by removing an outer wall of housing 30. Housing 30 has an entrance opening 32 and exit opening 34 through which fiber cable 12 is passed. Housing 30 further has a conduit 36 that communicates with the optoelectric converter housing 38, allowing the pigtail optical fibers 15 separated from fiber cable 12 to pass from optical sidecar enclosure 31 into a housing 38 which contains an opto-electronic converter and (optionally) a trunk amplifier. Optical sidecar 16 may be fixedly attached to housing 38 by any suitable means, such as bolts, screws, or welding, so long as the sealing and shielding capacity of the optical sidecar enclosure 31 is not breached.

Preferably, optical sidecar 16 is sealed to protect the optical fibers 14 therein from exposure to the environment and shielded against EMI effects. Openings 32 and 34 are formed with a suitable gasket 40 or like device surrounding the fiber cable 12 to maintain a water- and pressure-tight seal within the sidecar enclosure 31, as well as to shield against EMI leakage. Carbon-filled silicone may be advantageously used to form gaskets 40, however, other appropriate material having the required sealing and shielding capabilities are well known in the art.

Figure 4:
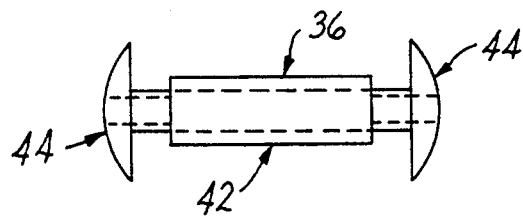
FIG. 4 is an illustration of details of the optical fiber sidecar conduit of FIG. 3.
Figure 5:
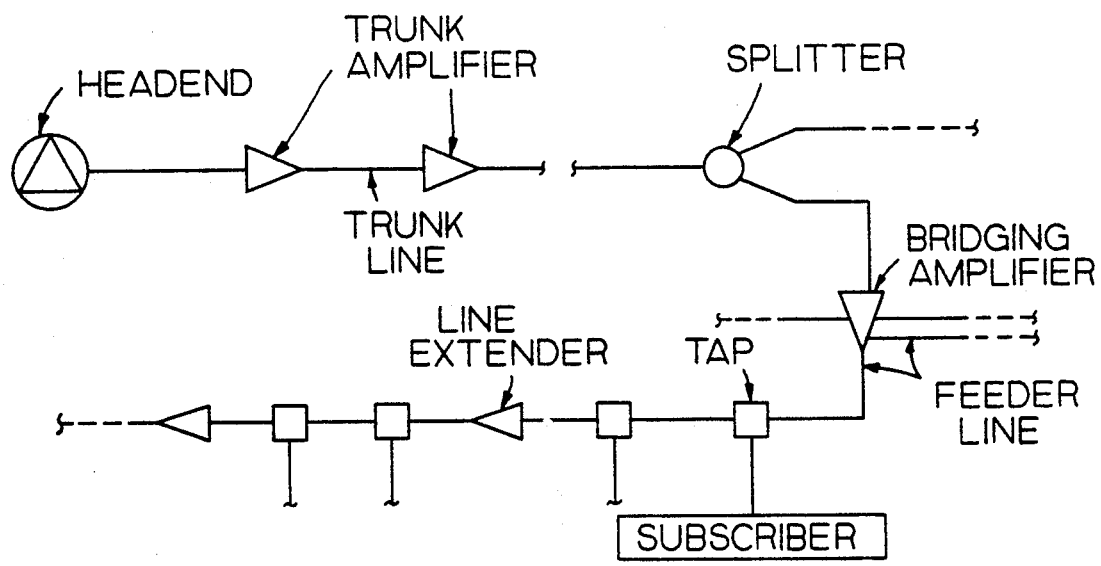
FIG. 5 is a diagrammatic view of a conventional CATV distribution system.

Conduit 36 (see FIG. 3) is formed such that optical sidecar 16 and optoelectric converter housing 38 are maintained in a sealed and shielded relationship. In one preferred embodiment (see FIG. 4), conduit 36 comprises a threaded bushing 42 extending between the adjacent outer walls of optical sidecar housing 30 and converter housing 38, with threaded grommets 44 attached to each end of bushing 42 within said housings 30 and 38, forming a sealed and shielded passageway through which pigtail optical fibers 15 are passed. Bushing 42 and grommets 44 may be formed of any suitable rigid or flexible materials having the necessary sealing and shielding capabilities, such as aluminum and rubber, respectively. The diameter of conduit 36 is determined by such factors as the number of pigtail optical fibers 15 inserted there through, the thickness of the pigtails and the variety of different types of fibers with which the optical sidecar would be employed. Preferably, conduit 36, forms a close-fitting protective sleeve around pigtail optical fibers 15.

Within optical sidecar enclosure 31, a plurality of splice trays 46 may be employed to position the optical fibers 14, 15 passed through optical sidecar 16. In a preferred embodiment, six splice trays 46 are placed in a vertical stack within the optical sidecar enclosure 31. Individual optical fibers 14, 15 from main cable 12 are arranged on splice trays 46 such that the minimum bend radii for the individual optical fibers 14, 15 are not exceeded, to avoid physical damage to and signal losses from the fibers 14, 15. For example, single mode optical fibers may have a bend radius of 1.25 inches. The physical size of the optical sidecar enclosure 31 is, therefore, determined by the minimum bend radii of the particular types of optical fibers utilized. Up to four optical fibers may be broken out from main cable 12, using known techniques, such as cutting, and are preferably spliced to a pigtail optical fiber 15 extending through conduit 36 to the optoelectric converter 18. The remaining fibers 14 continue uninterrupted from optical fiber sidecar 16 through the CATV distribution network to the next distribution node.

The present invention is particularly adapted for use in CATV distribution systems in which single or monomode optical fibers are employed for transmission of optical signals. Utilization of this invention is, however, specifically contemplated for other types of fibers such as multimode and graded-index fiber.

From the foregoing description, it will be apparent that there has been provided an improved CATV fiber optic distribution network utilizing a novel optical fiber sidecar for an optoelectric converter that is integrally sealed and shielded with the converter housing to protect the optical fibers from physical damage and signal loss. Various modifications to the preferred embodiments described herein may be apparent to those skilled in the art without departing from the scope of the present invention, which is only limited by the appended claims. Accordingly, the embodiments shown and described are only illustrative, not restrictive.

We claim:

1. An optical fiber sidecar comprising:
   an enclosure having an entrance opening and an exit opening through which a fiber cable containing at least one continuous optical fiber is passed;
   said enclosure including means for positioning one or more optical fibers within said enclosure such that the minimum bend radius of each optical fiber is not exceeded;
   said enclosure including a conduit separate from said entrance and exit openings, said conduit having conduit means for passing one or more optical fibers from within said enclosure; and wherein said enclosure and said conduit means are water-tight and pressure-tight.

2. An optical fiber sidecar comprising:
an enclosure having an entrance opening and an exit opening through which a fiber cable containing at least one continuous optical fiber is passed;
said enclosure including means for positioning one or more optical fibers within said enclosure such that the minimum bend radius of each optical fiber is not exceeded;
said enclosure including a conduit separate from said entrance and exit openings, said conduit having conduit means for passing one or more optical fibers from within said enclosure; and
wherein said enclosure and said conduit means are shielded against electromagnetic interference leakage.

3. An optical fiber sidecar comprising:
an enclosure having an entrance opening and an exit opening through which a fiber cable containing at least one continuous optical fiber is passed;
said enclosure including means for positioning one or more optical fibers within said enclosure such that the minimum bend radius of each optical fiber is not exceeded;
said enclosure including a conduit separate from said entrance and exit openings, said conduit having conduit means for passing one or more optical fibers from within said enclosure; and
wherein an outer wall of said enclosure is removable to allow access to said optical fibers passing therethrough.

4. An optical fiber sidecar for an optoelectronic converter comprising:
a water-tight and pressure-tight enclosure;
said enclosure having an entrance opening and an exit opening through which a fiber cable containing at least one continuous optical fiber is passed;
said enclosure including a plurality of splice trays for positioning one or more optical fibers within said enclosure such that the minimum bend radius for each optical fiber is not exceeded; and
a conduit separate from said entrance and exit openings for passing one or more optical fibers from within said enclosure to an optoelectronic converter;
said conduit comprising a cylindrical sleeve and sealing means on each sleeve end forming water-tight and pressure-tight seals for said conduit.

5. An optical fiber sidecar according to claim 4 wherein said enclosure and said conduit are shielded against electromagnetic interference leakage.

6. An optical fiber sidecar according to claim 4 wherein said enclosure is fixedly attached to a housing for an optoelectric converter.

7. An optical sidecar according to claim 4 wherein an outer wall of said enclosure is removable to allow access to said optical fibers passing therethrough.

8. An optical fiber sidecar for an optoelectronic converter comprising:
an enclosure having an entrance opening and an exit opening through which a fiber cable containing first and second sets of optical fibers is passed;
said first set of optical fibers including at least one continuous optical fiber that passes through said entrance and exit openings;
said second set of optical fibers including at least one optical fiber that passes through said entrance opening and is separated from said fiber cable within said enclosure;
said enclosure including means for positioning said second set of optical fibers within said enclosure such that the minimum bend radius for each said second optical fiber is not exceeded; and
said enclosure including a conduit separate from said entrance and exit openings;
said conduit having conduit means for passing said second set of optical fibers from within said enclosure to an optoelectronic converter.

9. An optical sidecar for an optoelectronic converter according to claim 8 wherein said enclosure and said conduit means are water-tight and pressure-tight.

10. An optical sidecar for an optoelectronic converter according to claim 8 wherein said enclosure and said conduit means are shielded against electromagnetic interference leakage.

11. An optical sidecar for an optoelectronic converter according to claim 8 wherein said enclosure is fixedly attached to a housing for an optoelectronic converter.

12. An optical sidecar according to claim 8 wherein an outer wall of said enclosure is removable to allow access to said optical fibers passing therethrough.

* * * * *